March 26, 1929.  C. J. ROCQUIN  1,706,547
RAKE
Filed March 24, 1928
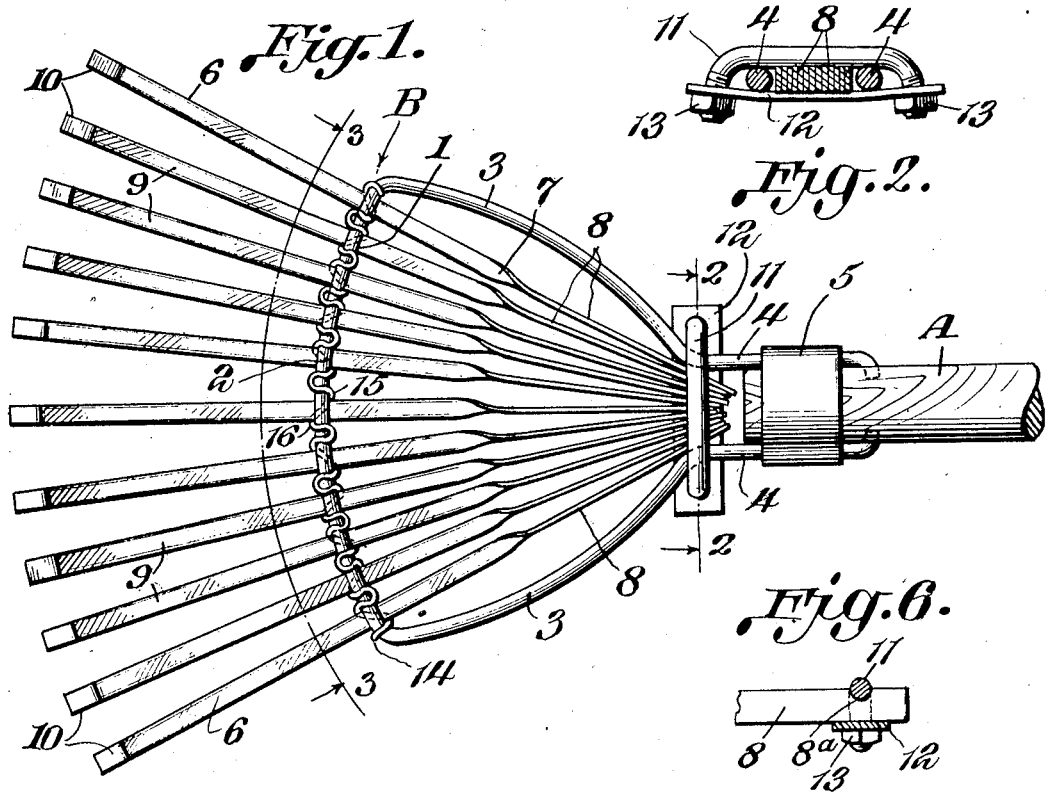
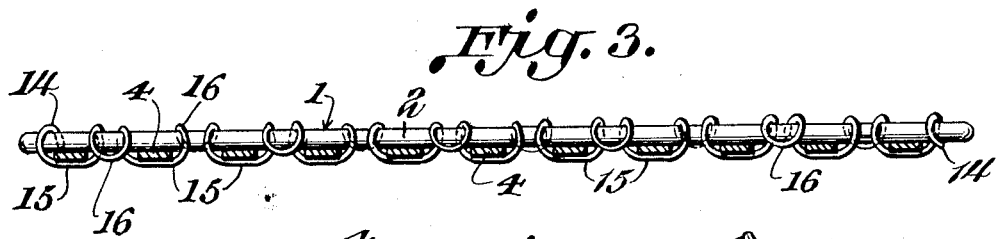
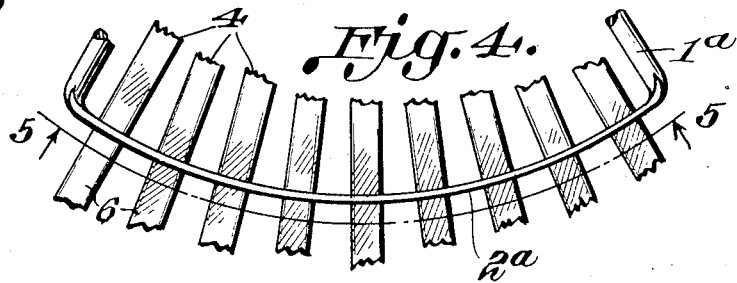
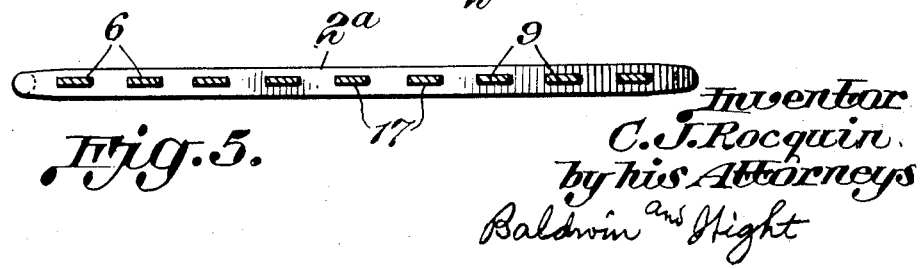
Inventor
C. J. Rocquin
by his Attorneys
Baldwin and Hight Patented Mar. 26, 1929.

1,706,547

UNITED STATES PATENT OFFICE.

CAMILLE J. ROCQUIN, OF NEW ORLEANS, LOUISIANA.

RAKE.

Application filed March 24, 1928. Serial No. 264,533.

This invention relates to a rake which can be manufactured with a minimum number of parts and quickly and readily assembled and wherein one or more tines may be easily replaced if they become broken. Various features of the invention will be apparent from the detailed description and the appended claims.

In the drawings:

Figure 1 is a top plan view of one form of rake,

Figure 2 is a section on the line 2—2 of Figure 1,

Figure 3 is a section on the line 3—3 of Figure 1,

Figure 4 is a top plan view of a portion of a modification,

Figure 5 is a section on line 5—5 of Figure 4, and

Figure 6 is a central cross-sectional view of Figure 2.

My invention comprises a rake consisting of a handle A and a head B.

The head B includes an open-frame 1 which is preferably formed from a metal rod bent to provide an arcuate cross-bar 2 and side arms 3—3, the latter terminating in spaced parallel attaching arms 4—4 arranged on opposite sides of the handle A and rigidly connected thereto by a clamp 5. Secured to the relatively rigid open-frame 1 is a plurality of relatively flexible tines 6 which are formed from flat strips of metal. These strips are twisted intermediate their ends as at 7 to form resultant inner and outer end portions 8 and 9 respectively, the extreme ends of the outer portions 9 being curved downwardly to form teeth 10. By providing the twists 7 in the tines, the inner and outer end portions of each tine are disposed in planes arranged at right angles to each other. By means of this, the inner portions 8 of the tines are adapted to be assembled in very close and compact relation, and the outer end portions are adapted to extend beyond the cross bar 2 of the open-frame 1, as shown particularly in Figure 1.

The inner end portions 8 of these tines are located between the side arms 3—3 of the frame 1 and terminate between the attaching arms 4—4 of said frame. A two-part clamp is employed for rigidly securing the inner end portions 8 to the frame 1. This clamp includes a U-shaped clamping bolt 11, a clamping plate 12 having openings therein for receiving the ends of the bolt, and clamping nuts 13, 13. The inner end portion 8 of each tine is formed with a recess $8^a$ in its edge for receiving the connecting portion of the U-bolt 11 whereby the tines and the U-bolt are interlocked with each other. Inasmuch as the clamp is held against forward movement by the open frame 1, the tines are consequently held against separation relative to the frame when the rake is in use. This two-part clamp embraces the inner ends 8 of the tines and the attaching arms 4—4 of the frame 1 and serves to rigidly connect said parts. The tines are rigidly secured to the cross bar 2 by means of a wire 14 which is bent to form a series of alternate loops 15 and 16, the loops 15 embracing the respective tines and the loops 16 embracing the cross bar 2 intermediate the tines whereby said loops 16 not only function to rigidly connect the tines with the cross bar but also function to retain the tines in uniformly spaced relation.

In the modification shown in Figures 4 and 5, the frame $1^a$ includes an arcuate cross bar $2^a$ which in this instance is flattened and provided with a plurality of spaced openings 17 for receiving and retaining the outer end portions 9 of the tines.

It is apparent that the open frame 1 being relatively rigid as compared to the tines, the latter will be firmly supported by the frame so that the tines will not be permanently displaced from their normal positions while the rake is in use.

It is of course to be understood that the details of structure and arrangements of parts may be variously changed and modified without departing from the spirit and scope of my invention.

I claim:

1. In a rake, the combination of a handle and a head, the head comprising an open and relatively rigid frame including a cross bar and side arms, the latter being attached to the handle, and a plurality of relatively flexible tines formed from flat strips of metal twisted intermediate their ends to form inner and outer end portions arranged in planes at right angles to each other, the inner end portions being disposed in flat compact relation between the side arms of the frame and the outer end portions extending beyond the cross bar of the frame and having rigid connection therewith, and means for securing the inner end portions of the tines against movement relative to the side arms of the frame.

2. In a rake, the combination of a handle and a head, the head comprising an open frame including a cross bar and side arms, the latter being attached to the handle, and a plurality of tines formed from flat strips of metal twisted intermediate their ends to form inner and outer end portions arranged in planes at right angles to each other, the inner end portions being disposed in flat compact relation between the side arms of the frame and the outer end portions extending beyond the cross bar of the frame and having rigid connection therewith, and means for securing the inner end portions of the tines against movement relative to the side arms of the frame comprising a two part clamp embracing the inner end portions of the tines and the side arms of the frame.

3. In a rake, the combination of a handle and a head, the head comprising an open frame including a cross bar and side arms, the latter being attached to the handle, and a plurality of tines formed from flat strips of metal twisted intermediate their ends to form inner and outer end portions arranged in planes at right angles to each other, the inner end portions being disposed in flat compact relation between the side arms of the frame and the outer end portions extending beyond the cross bar of the frame, a wire bent into a series of alternately extending loops, certain of the loops extending around the tines and the remaining loops extending around the cross bar for securing the tines to said cross bar, and means for securing the inner end portions of the tines against movement relative to the side arms of the frame comprising a two part clamp embracing the inner end portions of the tines and the side arms of the frame.

4. In a rake, the combination of a handle and a head, the head comprising an open frame including a cross bar and side arms, the latter being attached to the handle, and a plurality of tines having inner end portions and outer end portions, the inner end portions being rigidly secured to the side arms of the frame, the outer end portions extending beyond the cross bar of the frame, a wire bent into a series of alternately extending loops, certain of the loops extending around the tines and the remaining loops extending around the cross bar for securing the tines to said cross bar, and means for securing the inner end portions of the tines against movement relative to the side arms of the frame comprising a two part clamp embracing the inner end portions of the tines and the side arms of the frame.

In testimony whereof, I have hereunto subscribed my name.

CAMILLE J. ROCQUIN.